United States Patent [19]
Ross

[11] 4,446,571
[45] May 8, 1984

[54] VISOR

[76] Inventor: Gary Ross, 1128 24th St., Apt. B, Santa Monica, Calif. 90403

[21] Appl. No.: 325,334

[22] Filed: Nov. 27, 1981

[51] Int. Cl.³ .............................................. A61F 9/04
[52] U.S. Cl. ........................................................ 2/13
[58] Field of Search .......................... 2/13, 12; 351/47

[56] References Cited

U.S. PATENT DOCUMENTS

| 542,015 | 7/1895 | Goodman | 2/13 |
|---|---|---|---|
| 2,762,050 | 9/1956 | Bricker | 2/13 |
| 3,204,252 | 9/1965 | Herrington, Sr. | 2/13 |
| 3,276,035 | 10/1966 | Jacobson | 2/13 |
| 4,106,119 | 8/1978 | Taupin | 2/12 |

FOREIGN PATENT DOCUMENTS 0915463  1/1963  United Kingdom ...................... 2/13

OTHER PUBLICATIONS

Gershman, "Self Adhering Nylon Tapes", 10/18/58, p. 930.

Primary Examiner—Peter P. Nerbun
Attorney, Agent, or Firm—Thomas I. Rozsa

[57] ABSTRACT

An improved sun visor which can be laid flat in its unused state in order to facilitate ease of storage and which can be removably attached to the temples of a pair of eyeglasses or sunglasses.

4 Claims, 8 Drawing Figures

U.S. Patent May 8, 1984 4,446,571
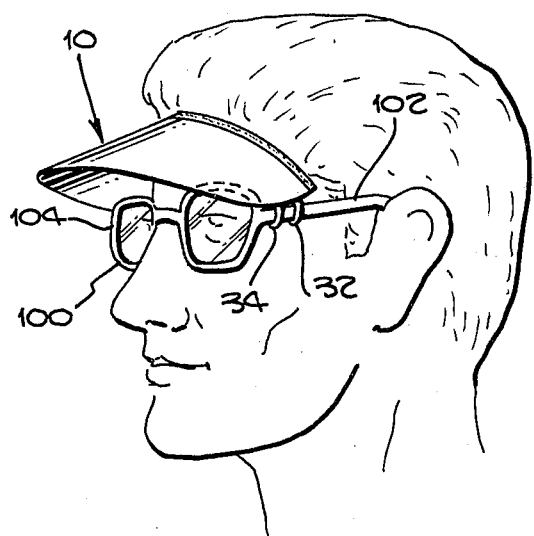
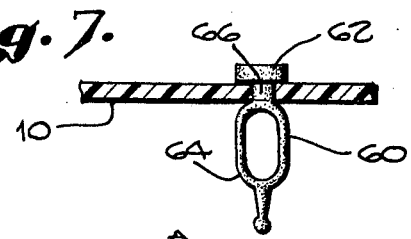
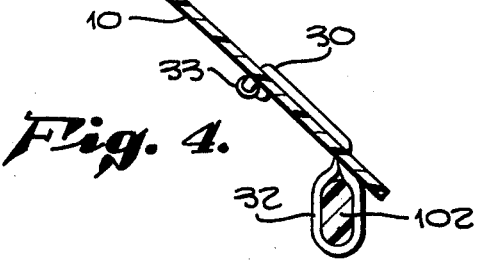
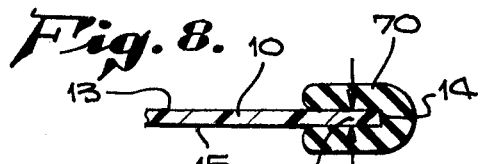
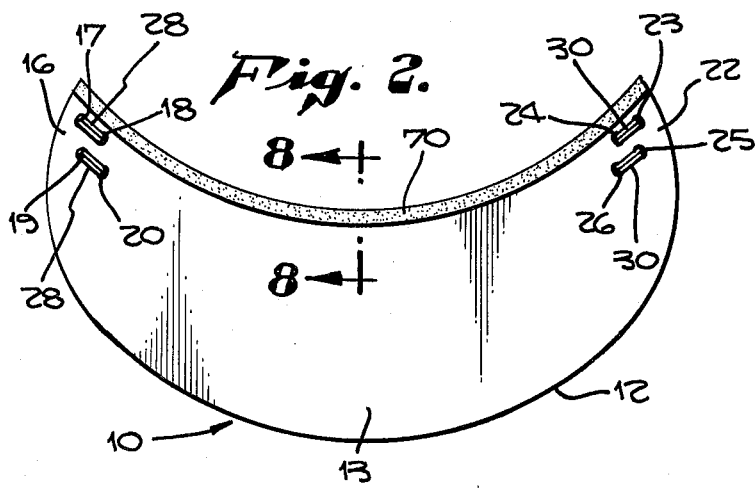
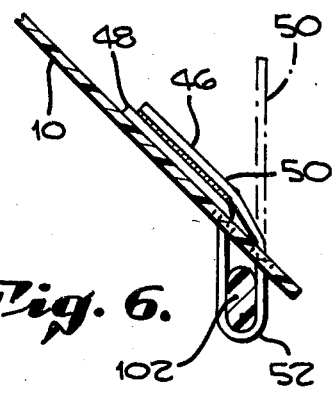
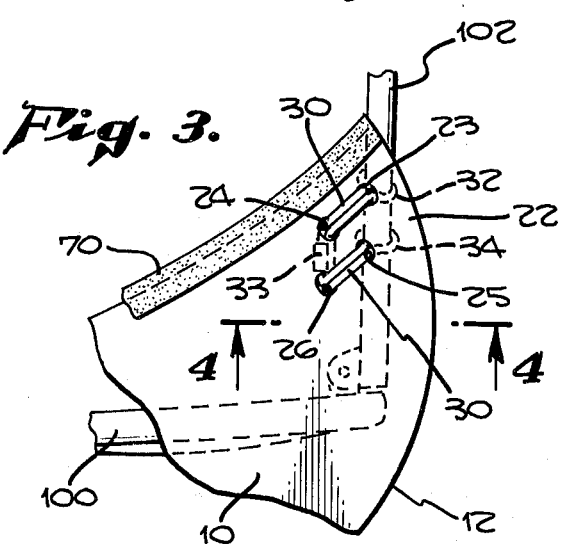
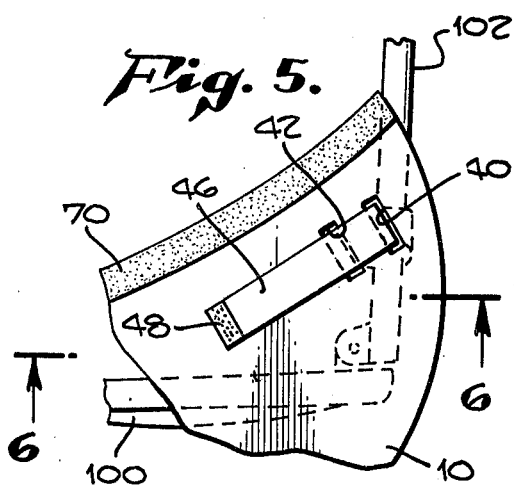

VISOR

The present invention relates to an improved visor which can be removably attached to the temples of a pair of glasses.

Traditionally, a visor was defined as a projecting piece on a cap shielding the eyes. In the nineteenth and twentieth century, several developments in the field of visors created innovations which enabled the visor to be a separate piece of material, independent of a cap or hat. A primary function of a visor was to act as a sunscreen to shield the wearer's eyes from the glaring rays of the sun. Conventional sun visors were constructed in a manner similar to a hat or head band. The traditional design of a visor was in the shape of a curved piece of material which was stiffened at its rear portion where the visor came in contact with a person's forehead. Either an elastic band or a stiff semicircular band was attached to both ends of the visor at its rear portion. The band was worn around the wearer's head while the forward visor portion rested on the wearer's forehead. While shielding the wearer's eyes from the sun, this design provides several major disadvantages.

First, the tight fitting band was uncomfortable to wear. Second, as a fashion element, this visor design was unsightly as it often pressed against the wearer's hair and caused the wearer's hair to be wrinkled and pressed out of its intended design. This was especially true for female wearers. A third disadvantage arose from the fact that the visor actually touched the forehead. Since it usually covered the lower portion of the forehead but did not cover the upper portion, the wearer's forehead was tanned just above the visor but not tanned just below the visor. The result was an unsightly sun tan line across the middle of the person's forehead. If the visor was worn high on the head to correct the problem of the unsightly tan line, then the entire forehead would be shaded and receive no tan while the remainder of the wearer's face was tanned. Therefore, the problems associated with the conventional sun visor were its large cumbersome design which made it uncomfortable to wear, its destructive effect on the wearer's hair style, and its effect on eliminating tanning of the forehead or causing only part of the forehead to be tanned.

In today's fashion and good-looks conscious society, these disadvantages outweighed the advantages of reducing the glare of the sun in the wearer's eyes and therefore this type of visor has fallen dramatically in popularity and commercial sales.

The prior art has seen several designs for sun visors, all of them based on the structure of a hat or head band. One improvement to eliminate the glare of the sun in a person's eyes and also eliminate the disadvantages of the conventional visor has been the use of clip-on glasses. These are dark sun shielding glasses which are designed to clip on clear eyeglasses. These in fact only serve the same functions as sun glasses and really do not provide an effective sun screen over the face area.

Therefore, the prior art has not developed any effective visor which will shield a person's eyes from the glaring rays of the sun while at the same time not containing the disadvantages associated with the traditional type of visor.

SUMMARY OF THE PRESENT INVENTION

It has been discovered, according to the present invention, that if a visor is designed so that it can be removably attached to a pair of eyeglasses, the improved visor can provide an effective shield from the glaring rays of the sun while at the same time eliminating the problems associated with conventional and traditional visors. By attaching the visor to a pair of glasses, the large cumbersome design of traditional visors is removed. In addition, the destructive effect on the wearer's hair style is eliminated because there is no stiff or flexible band which will wrap around the wearer's hair. Finally, since the visor will not come in contact with the person's forehead, the problem of entirely blocking the forehead or only partially tanning the forehead is eliminated.

It has also been discovered, according to the present invention, that if a visor is removably but rigidly attached to a pair of glasses, the improved visor can be worn during vigorous athletic events such as tennis or volleyball without falling off or becoming distorted on the wearer.

It has additionally been discovered, according to the present invention, that if the attachment is by means of an adjustable VELCRO strip, the improved visor can be adjusted to fit around the temples or arms of a multiplicity of eyeglass designs.

It has further been discovered, according to the present invention, that if the visor is manufactured in a flat state out of flexible material such as plastic or fabric, the visor can be easily and cheaply mass produced. In addition, the visor can be accommodated in the specialty commercial market where decorations, trademarks, names, and other items can be printed or otherwise embossed onto the top of the visor.

It has also been discovered, according to the present invention, that if a rubber border is fabricated onto the rear portions of the visor, the life of the visor is increased significantly as this rear edge which can rub against the eyeglasses when the visor is attached to them is protected from excessive wear and tear.

It is therefore an object of the present invention to provide an improved visor for shielding a person's eyes from the rays of the sun.

It is another object of the present invention to provide an improved visor which is designed so that it can be removably attached to a pair of eyeglasses. It is within the course and scope of the present invention to provide an attaching means which is both rigid enough to enable the visor to be worn during vigorous athletic activity and modifiable to allow adjustment to a multiplicity of eyeglass designs.

It is further an object of the present invention to provide an improved visor which is attractive in design and light in weight, so that the wearer has the incentive to wear the visor as an attractive fashion complement to the wearer's outfit during everyday use as well as during sunbathing or playing such sports as tennis.

It is an additional object of the present invention to create an improved visor which can be easily and cheaply mass produced. It is also one intent of the present invention to create a visor on which a multiplicity of designs or other printed matter may be placed or on which a multiplicity of designs may be embossed.

It is still another object of the present invention to provide a visor which is designed for long life and which can be subjected to wear and tear while still retaining its attractiveness and functionality as a visor.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation there is illustrated:

FIG. 1 is a pictorial view of the improved visor as worn by a person.

FIG. 2 is a top plan view of the present invention in a flattened or unflexed state.

FIG. 3 is an enlarged detailed view of the top right hand corner of the present invention as shown in FIG. 2, including a portion of a temple from a pair of eyeglasses mounted on said invention.

FIG. 4 is an enlarged fragmentary sectional view taken along line 4—4 of FIG. 3.

FIG. 5 is an enlarged detailed view of the top right hand corner of the present invention showing an alternative form of attachment means, including a portion of a temple from a pair of eyeglasses mounted on said invention.

FIG. 6 is an enlarged fragmentary sectional view taken along line 6—6 of FIG. 5.

FIG. 7 is a side view of the top right hand corner of the present invention with another form of attachment means.

FIG. 8 is an enlarged fragmentary sectional view taken along line 8—8 of FIG. 2.

DETAILED DESCRIPTION OF THE PREFERRED EMBODIMENT

With reference to the drawings of the invention in detail and more particularly to FIG. 1, there is shown at 10 the preferred embodiment of the Improved Visor as worn by a person. As can readily be seen from FIG. 1, the visor is completely supported by the temples of a pair of eyeglasses. In FIG. 1, the left temple 102 of the pair of eyeglasses 100 is shown. In FIG. 1, the present invention 10 is shown as worn well back on the temples, as a result, a substantial portion of the wearer's forehead is shielded by the improved visor 10. If the improved visor 10 is worn adjacent the rim 104 of the pair of eyeglasses 100, the wearer's forehead would be exposed and would be tanned by the sun. This in no way reduces the effectiveness of the improved visor's (10) ability to shield the wearer's eyes from the glaring rays of the sun. It is apparent from the view in FIG. 1 that the improved visor 10 in no way touches or impairs the design of the wearer's hair. The view on FIG. 1 also shows that the improved visor 10 is far less cumbersome than the bulky traditional visor which has the tight fitting band wrapped around the wearer's hair.

A top plan view of the improved visor 10 in a flattened or unflexed state is shown in FIG. 2. In general, the visor is in the shape of an arcuate partial disc having a front edge 12 with a radius different from the radius of the rear edge 14. The improved visor also contains an upper surface 13 and a lower surface 15. The general configuration of the improved visor is comparable to the front or shading portion of the conventional sun visors or to the forward portion of a conventional cap. In the preferred embodiment, the radius of the forward edge 12 is approximately 7½ inches while the radius of the rear edge 14 is approximately 4⅝ inches. At its longest point, the improved visor 10 is approximately 7½ inches long while at its portion in the center the improved visor is approximately 2⅝ inches wide.

One point of novelty in the present invention consists of the fact that this improved visor 10 can be removably, adjustably, and securely attached to a pair of eyeglasses 100. A preferred attachment means is shown in FIG. 2 and further shown in greater detail in FIG. 3 and FIG. 4.

As shown in FIG. 2, a pair of spaced holes are placed on both rear corners of the improved visor 10. Although the visor body is made of one piece construction, for description purposes the rear corners will be described as left rear corner 16 and right rear corner 22. Left rear corner 16 contains a first pair of spaced holes 17 and 18, and a second pair of spaced holes 19 and 20. Right rear corner 22 contains a first pair of spaced holes 23 and 24 and a second pair of spaced holes 25 and 26. By way of example only, the first pair of spaced holes 17 and 18 on the left rear corner 6 can each be approximately ⅜ of an inch from rear edge 14 and the first pair of spaced holes 23 and 24 on the right rear corner 22 can each be approximately ⅜ of an inch from rear edge 14. Hole 17 can be approximately ⅜ of an inch from hole 18 and hole 23 can be approximately ⅜ of an inch from hole 24. Hole 19 can be approximately 5/16 of an inch from hole 17, hole 20 can be approximately 5/16 of an inch from hole 18 and holes 19 and 20 can be spaced approximately ⅜ of an inch apart. Hole 25 can be approximately 5/16 of an inch from hole 23, hole 26 can be approximately 5/16 of an inch from hole 24 and holes 25 and 26 can be spaced approximately ⅜ of an inch apart. Hole 17 can be approximately ¼ inch from the left edge and hole 19 can be approximately ¼ of an inch from the left edge. Hole 23 can be approximately ¼ of an inch from the right edge and hole 25 can be approximately ¼ inch from the right edge. This is by way of example only, as the holes can be located at a greater or lesser distance from rear edge 14 and spaced apart from each other at a greater or lesser distance than indicated above. The left holes can also be viewed as a pair of left outer holes 17 and 19 and a pair of left inner holes 18 and 20. The right holes can also be viewed as a pair of right outer holes 23 and 25 and a pair of right inner holes 24 and 26. Fitted through holes 17, 18, 19 and 20 is left elastic attaching means 28. Fitted through holes 23, 24, 25 and 26 is right elastic attaching means 30. By way of example, each elastic attaching means can be a ponytail tie. The method of attachment is shown in greater detail in FIGS. 3 and 4. Referring to FIG. 3, the right elastic attaching means 30 is inserted into holes 23, 24, 25 and 26 such that the closed portion 33 is adjacent the pair of right inner holes 24 and 26 while the opened portion extends through the pair of right outer holes 23 and 25, thereby forming right receiving loops 32 and 34 extending from the lower surface 15. In the embodiment shown in FIG. 3, a ponytail tie is used for the attaching means and is inserted through holes 23, 24, 25 and 26 such that it forms the receiving loops through the outer holes. By using an elastic attaching means 30 in this manner, the rims 102 of eyeglass 100 can easily be slid through receiving loops 32 and 34, as shown in FIG. 3. Tighter adjustment of the temple 102 can be achieved by pulling on the closed portion 33. Through this means, the improved visor 10 can be easily and removably attached to the eyeglasses 10. Furthermore, due to the elastic nature of the attaching means 28 and 30, the rims of the eyeglass 100 are securely held by the elastic attaching means 28 and 30, thereby assuring that the improved visor 10 can be worn even during vigorous physical activity such as playing tennis or volleyball. On the left side of the improved visor 10, the elastic attaching means 28 is inserted through holes 17, 18, 19 and 20 such that it forms receiving loops which extend through outer holes 17 and 19. When worn on a pair of eyeglasses 100, the right elastic receiving loops 32 and 34 at their counterparts on the left side enable the improved visor 10 to be bowed to form a shade over the wearer's eyes as shown in FIG. 1, while at the same time allowing the eyeglasses to be securely held in the elastic gripping means. This is also shown in enlarged detail in FIG. 4.

An alternative attaching means using a VELCRO strip is shown in FIG. 5 and FIG. 6. In this embodiment, the four holes on each corner are replaced by two lateral slots. As shown in FIG. 5, the right hand corner 22 contains an outer right hand slot 40 and an inner right hand slot 42. Comparable outer and inner slots are located in the left hand corner 28. By way of example only, each slot can be located approximately 9/16 inches from rear edge 14 and can be spaced approximately ⅛ of an inch apart. Each slot can be approximately 5/16 of an inch long as shown in FIG. 5. The slot adjacent each edge can be approximately ⅜ of an inch from each edge. Right VELCRO strip 46 is placed on right corner 30 such that the female edge 48 is rigidly affixed to the upper surface of the improved visor 10. The male portion 50 of the VELCRO strip 46 extends through the inner or second slot 42 and then through the outer or first slot 40, thereby forming right receiving loop 52. The male 50 and female 48 members are then removably joined on the upper surface of the improved visor 10, as shown in FIG. 6.

A comparable VELCRO arrangement is located on the left corner 28. The advantage of the VELCRO attaching means is that it allows for a multiplicity of tightnesses in the receiving loop and therefore enables the improved visor to accommodate a multiplicity of eyeglass designs which have varying types of temples.

A third alternative embodiment for the removable attaching means is shown in FIG. 7. In this embodiment, only one slot is formed on each corner 28 and 30 respectively. As shown in FIG. 7 on the right corner a rubber extrusion 60 is placed into the right slot such that its upper portions 62 and neck 66 secure the extrusion to the improved visor 10 and its lower portion 64 forms the receiving loop. A comparable extrusion is placed into the left slot. By way of example only, the rubber extrusion 60 can have an overall length of 7/16 inches and the receiving portion 64 can stretch from an inner diameter of ¼ inch to an inner diameter of ½ inch. It is important that the rubber used for the extrusion 60 have perfect memory, be resistant to ultra violet light and can withstand temperature extremes from 0° F. to 150° F.

All three attaching means provide a flexible and modifiable receiving means which can securely hold the improved visor 10 to the eyeglasses.

As discussed previously, the rear edge 14 at the improved visor 10 can be subject to greater wear and tear than other portions of the visor because the rear edge 14 can come in contact with the eyeglasses 100 and on occasions possibly with the wearer's forehead. As a result, it is necessary to protect the the rear edge 14 in order to assure a longer life. Additionally, the plastic or other material out of which the improved visor 10 is made can be sharp and could possibly cut the wearer's forehead if the improved visor 10 is accidentally pushed against the wearer's forehead. To solve both of these problems, an improved shield 70 is rigidly affixed to the rear edge 14. This is shown in FIG. 2 and in greater detail in FIG. 8. The shield is in the form of a U-shaped channel which runs the entire length of rear edge 14. By way of example, the improved shield can be made of thin light-weight vinyl. If the thickness of the improved visor 10 is approximately 0.025 inches, the thickness of the U-shaped channel 72 should be approximately 0.02 inches. The length of the improved shield 70 can be approximately 3/16 inches long. An improved neoprene shield of this design enables the improved visor 10 to withstand significantly greater wear and tear and also provides an effective shield to protect the wearer in the event the improved visor 10 is inadvertently pressed against the wearer's forehead.

Although the rubber vinyl U-shaped channel member is the preferred form of improved shield 70, it is also within the spirit and scope of the present invention to use a felt strip across the top and rear edge 14 of the improved visor 10 to serve this shielding and extra wear purpose.

Sunglasses are now standard everyday items for most everyone. Twenty years ago this wasn't true. Sun visors are accepted not only as a common solution to glare, but as a stylish accessory for both sexes. People are becoming more aware of the dangers of the sun to the eyes, and also its effect on aging and wrinkling of the skin. On the other hand, more and more people are enjoying the sun, not only sunbathing, but many sports and other outdoor activities. Sun visors and sunglasses are commonly worn together. It's "the look" today everywhere. Many people would enjoy the benefit of a sun visor if it weren't for the discomfort of the band around one's head. The present invention has created the concept of using the eyeglasses or sunglasses as the support to which the improved visor is attached. The present invention is a simple and stylish new product. The wearer never has to mess with his or her hair while obtaining the shade benefits. The improved visor 10 is flexible, but rigid enough to keep its shape in wind or active sports activity. The present invention can be easily carried since it is flat in its unused form. The improved visor 10 only assumes its curved bill-like shape when it is attached to a pair of glasses.

In its preferred form, the body of the improved visor 10 is made of tough press polished vinyl which can withstand temperatures of up to approximately 180° F. It can also be made of 0.02 mm rigid vinyl. The advantages of this design and material provides for a superior visor which is light, small, and has a narrow bill which is still sufficient to provide effective shade.

As discussed above, there are two independent points of attachment which receive the side arms or temples of the glasses. The improved visor will take on a smooth curve due to the flexibility of the material in relation to the points of attachment. Many systems, as described above, have been devised to fit within the framework of the working product. These attaching means include the use of an elastic chord, a VELCRO strip, rubber extrusions, and clamps.

The present invention's tough construction is designed for the most demanding work, sport, or play. It is so portable that is is preferred as an accessory shade system. Its simple flatted design enables the improved visor to be fit into any purse, glove box, or back pocket.

The present invention can be used for a multiplicity of activities including but not limited to sunbathing, backpacking, boating, skiing, fishing, golf, tennis, biking, running, gardening, river rafting, rock climbing, sailing and hiking. It can also be worn while watching spectator sports. The improved visor is so light in weight that the wearer hardly knows it's there. It eliminates the sweat band effect of conventional visors and also eliminates the necessity of wearing a hat to obtain shade. It's light, inexpensive, effective, tough, easy to place onto eyeglasses and is always in style since it can be manufactured in a multiplicity of colors.

The present invention can be accommodated to a multiplicity of uses since it can be fabricated in numerous colors, including but not limited to green, blue, white, brown, red, yellow, gold, black, orange and purple. Since the 0.02 mm rigid vinyl or other material is flat, it is easy to place designs, logos or other graphic work onto the top or bottom of the improved visor by a multiplicity of methods including but not limited to printing, silk screenings and embossing. It can therefore be used as a color coordinated high fashion item since the protective rear shield of the attaching means can be color-coordinated with the body of the improved visor. It can also be used as a specialty or promotional item since many designs can be placed on the top or bottom of the improved visor.

Of course, the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment, and not to show all of the various forms of modification in which the invention might be embodied.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. An improved visor comprising:
   a. a flat body portion in the shape of an arcuate partial disc containing an upper surface, a lower surface, a curved forward edge and a curved rear edge;
   b. four left holes extending transversely through the body portion and located adjacent the left rear corner of said flat body portion so as to form a pair of left outer holes and a pair of left inner holes;
   c. four right holes extending transversely through the body portion and located adjacent the right rear corner of said flat body portion so as to form a pair of right outer holes and a pair of right inner holes;
   d. a left elastic attaching means extending through said four left holes so as to form a pair of left receiving loops extending through said pair of left outer holes and extending from the lower surface of the improved visor; and
   e. a right elastic attaching means extending through such four right holes so as to form a pair of right receiving loops extending through said pair of right outer holes and extending from the lower surface of the improved visor;
   f. whereby the improved visor can be removably attached to a pair of eyeglasses by placing the left temple of the eyeglasses through the left pair of receiving loops and by placing the right temple of the eyeglasses through the right pair of receiving loops and whereby the tension on the temples can be adjusted by pulling on the portion of the left attaching means extending through the left inner holes and by pulling on the portion of the right attaching means extending through the pair of right inner holes.

2. The invention as defined in claim 1 further comprising a U-shaped channel member encompassing the entire length of said curved rear edge of the improved visor, thereby forming a shield over the rear edge.

3. An improved visor comprising:
   a. a flat body portion in the shape of an arcuate partial disc containing an upper surface, a lower surface, a curved forward edge and a curved rear edge;
   b. two lateral slots extending transversely through the body portion and located adjacent the left rear corner of said flat body portion so as to form an outer left hand slot and an inner left hand slot;
   c. two lateral slots extending transversely through the body portion and located adjacent the right rear corner of said flat body portion so as to form an outer right hand slot and an inner right hand slot;
   d. a left adjustable attaching means made of VELCRO extending through said inner and outer left hand slots such that the female VELCRO member is permanently attached to the upper surface of said body portion adjacent said inner and outer left hand slots and the male VELCRO member extends first through said inner left hand slot and then into said outer left hand slot to thereby form a left receiving loop extending from the lower surface of the body portion; and
   e. a right adjustable attaching means made of VELCRO extending through said inner and outer right hand slots such that the female VELCRO member is permanently attached to the upper surface of said body portion adjacent said inner and outer right hand slots and the male VELCRO member extends first through said inner right hand slot and then into said outer right hand slot to thereby form a right receiving loop extending from the lower surface of the body portion;
   f. whereby the improved visor can be removably attached to a pair of eyeglasses by placing the left temple of the eyeglasses through the left receiving loop and by placing the right temple of the eyeglasses throught the right receiving loop and whereby the tension on the temples can be adjusted by changing the areas of mating between the female and male VELCRO members on the upper surface of the body member.

4. The invention as defined in claim 3 wherein each male VELCRO member is permanently attached to the upper body portion and the female VELCRO member extends through each inner and outer transverse slot respectively to form the left and right receiving loops.

* * * * *